United States Patent [19]
Wallace

[11] Patent Number: 5,564,715
[45] Date of Patent: Oct. 15, 1996

[54] TANDEM SEAL DEVICE FOR FLOW LINE APPLICATIONS

[75] Inventor: Thomas C. Wallace, Denver, Colo.

[73] Assignee: Corrosion Control Corp., Lakewood, Colo.

[21] Appl. No.: 138,129

[22] Filed: Oct. 15, 1993

[51] Int. Cl.⁶ .............................. F16J 15/12; F16L 58/00
[52] U.S. Cl. ...................... 277/58; 277/180; 277/207 A; 285/336; 285/363
[58] Field of Search ................. 277/105, 207 R, 277/180, 227, 235 R, 233, 181, 207 A, 208, 209, 210, 58, 183, 184, 189, 198; 285/363, 368, 910, 336, 351, 379

[56] References Cited

U.S. PATENT DOCUMENTS

| | | | |
|---|---|---|---|
| 494,402 | 3/1893 | Walsh | 285/910 |
| 1,965,273 | 7/1934 | Wilson . | |
| 2,520,089 | 8/1950 | Lippincott | 285/363 |
| 3,373,633 | 3/1968 | Desmond et al. . | |
| 3,544,138 | 12/1970 | Von Eiff | 285/336 |
| 3,930,656 | 1/1976 | Jelinek | 285/363 |
| 4,116,451 | 9/1978 | Nixon et al. | 277/180 |
| 4,406,467 | 9/1983 | Burger et al. . | |
| 4,690,438 | 9/1987 | Kanczarek . | |
| 4,776,600 | 10/1988 | Kohn | 285/336 |
| 5,076,591 | 12/1991 | Gentile | 277/180 |
| 5,277,455 | 1/1994 | Graves et al. | 285/363 |
| 5,316,320 | 5/1994 | Breaker | 277/207 A |
| 5,368,648 | 11/1994 | Sekizuka | 277/58 |
| 5,407,214 | 4/1995 | Lew et al. | 277/26 |

FOREIGN PATENT DOCUMENTS

3036700   5/1982   Germany .

Primary Examiner—Daniel G. DePumpo
Attorney, Agent, or Firm—Timothy J. Martin; Michael R. Henson

[57] ABSTRACT

A tandem seal device is provided for interposing and compressing between joined pieces of pipe in a flow line to prevent fluid leakage therebetween. The tandem seal device comprising a retainer body having an inner pair and an outer pair of continuous grooves. A first pair of seal elements, fabricated from a first material, being disposed in the inner pair of grooves. A second pair of seal elements, fabricated from a second material, being disposed in the outer pair of grooves.

34 Claims, 4 Drawing Sheets

TANDEM SEAL DEVICE FOR FLOW LINE APPLICATIONS

FIELD OF THE INVENTION

The present invention relates to a seal device which is adapted to be interposed and compressed between joined pieces of pipe in a flow line operative for a fluid to flow therethrough without fluid leakage therebetween. More specifically, the present invention is directed to a tandem seal device which is particularly useful in high pressure, high temperature and/or highly corrosive environments.

BACKGROUND OF THE INVENTION

For centuries, pipeline systems have been used to convey fluid. As early as 4000 B.C., clay pipes assembled into pipeline systems were used for drainage systems which operated on the basis of gravity flow. During Roman times, lead pipes were fabricated and assembled into pipeline systems for drainage. In some instances, tree trunks were bored and used as water or drainage pipes. During the 18th century, lack of sanitation, especially in cities, was considered a major cause of illness. To resolve this problem, pipeline systems were constructed to collect sewage throughout the city for conveyance to a central processing facility. Today, pipeline systems are used for the building, chemical, oil and gas, agricultural and mining industries and for public works applications. These modern pipeline systems convey various types of fluids which can be categorized as gases, liquids, colloidal suspensions and liquid/solid slurries.

In order to monitor and control the flow of the fluid through pipeline systems, in-line process control equipment is installed. In-line process control equipment includes valves, pumps, flow meters, temperature and pressure controllers. In-line equipment usually cannot be welded into the pipeline because time-scheduled maintenance requires temporary removal of this equipment and, occasionally, depleted equipment must be removed for replacement. Typically, in-line process control equipment is installed into the pipeline by joining flanged-end connections of that particular piece of in-line equipment with flanged-end connections of the pipeline. Simply bolting the flanged-end connections of the in-line process control equipment with those of the pipeline is not sufficient to assure adequate sealing between the joined flanged-end connections to prevent leakage. Seal devices are often interposed and compressed between the flanged-end connections so as to prevent leakage of the fluid therebetween.

Before selecting a seal device for a specific application, a myriad of factors is considered. These factors include the corrosive nature of the fluid flowing through the pipeline as well as the physical characteristics of the flowing fluid such as pressure, temperature and velocity. Although numerous types of materials may be considered in fabricating an appropriate seal for a particular application, often, the optimum material is compromised because of other overriding considerations. For example, a highly corrosive gas such as hydrogen sulfide can be conveyed through a pipeline at a high pressure and velocity. Optimally, a polymer material would be desirable for a seal device to prevent the seal device from corroding. However, a polymer material is not desirable under these conditions because of its proclivity to deform under high pressure, thus, compromising the integrity of its sealing capability.

In the past, a conventional tandem seal device has been used for high-pressure applications. This conventional tandem seal device comprises a retainer body having opposite first and second surfaces and a pair of continuous grooves formed into each surface. An O-ring fabricated from elastomeric material is disposed into each of the grooves. Although this conventional tandem seal device is effective for high pressure applications, it is not as effective in a corrosive environment. Again, the integrity of the sealing capability of this tandem seal device is compromised by the selection of a material appropriate for a high pressure environment but inappropriate for a corrosive one.

Another type of seal device which has been used as a standard in the industry for many years is a conventional graphite-filled, spiral-wound seal device. This conventional seal device includes an outer retainer body surrounding an inner seal assembly. The inner seal assembly comprises an outer carbon-steel guide ring which is designed to hold a series of windings of a laminate of a selected metal and a graphite filler. As the metal and graphite filler are wound together within the carbon-steel guide ring, spot weldments are intermittently made to secure the winding within the carbon-steel guide ring. To use this conventional seal device in a corrosive environment, a stainless steel is selected for the metal in the windings. Under nominal pressure conditions, this stainless steel/graphite seal device performs adequately in a corrosive environment.

Yet another fact to consider when selecting material for a seal device is the possibility of fire. For certain applications, local ordinance or fire code may require that the seal device be fire-resistant. Generally, a fire-resistant seal device means a seal device which will expand under extremely high temperature conditions to accommodate the thermal expansion of the joined flanged-end connections during a fire. A fire-resistant seal device is intended to prevent fluid leakage for only a brief period of time so that personnel could be safely evacuated before the flanged-end connection begins to leak.

Although approved under fire code as fire-resistant, the metal/graphite seal device, whether used in a corrosive or non—corrosive environment, is marginally beneficial when exposed to fire. However, in a fire, extreme temperatures can cause the spot weldments of the seal device to melt which, in turn, causes the windings of metal and graphite to burst part. Catastrophic failure of this graphite-filled, spiral-wound seal device results. Further, under high pressure conditions, the conventional graphite-filled, spiral-wound seal device performs only adequately.

Therefore, a need exists in the marketplace to provide a seal device which can perform well under highly corrosive, high temperature and/or high pressure conditions. There is also a need in the industry to provide a fire-resistant seal device which will not readily unwind when subjected to high temperatures generated by fire. It would also be advantageous if a seal could be custom-made for conditions of high pressure and corrosion or conditions of high pressure and fire resistance or conditions of corrosion resistance and fire resistance. The present invention addresses these needs and provides these advantages.

SUMMARY OF THE INVENTION

It is an object of the present invention to provide a new and useful tandem seal device which is particularly useful in highly corrosive, high temperature and/or high pressure environments.

It is a further object of the present invention to provide a fire-resistant tandem seal device which will not readily unwind while being subjected to high temperatures generated by a fire.

It is another object of the present invention to provide a tandem seal device which has an inner seal for performing a primary function of resisting corrosion, high temperature or high pressure and an outer seal for providing a secondary function of resisting a remaining one of corrosion, high temperature or high pressure.

According to the present invention, a tandem seal device is described which is adapted to be interposed and compressed between joined pieces of pipe in a flow line that is operative for a fluid to flow therethrough without fluid leakage therebetween. In its broadest form, the tandem seal device comprises a retainer body, a first pair of seal elements and a second pair of seal elements. The retainer body has opposite first and second surfaces and a central opening extending axially therethrough to allow the fluid to flow through the retainer body. The retainer body includes an inner pair of continuous grooves and an outer pair of continuous grooves. One of each of the inner grooves are formed into a respective one of the first and second surfaces in a spaced-apart surrounding relation to the central opening; each one of the outer grooves are formed into a respective one of the first and second surfaces in spaced-apart surrounding relation to the respective one of the inner pair of continuous grooves. Preferably, the retainer body is fabricated from a rigid material such as stainless steel alloys, metal alloys and epoxy. As an alternative, the retainer body is fabricated from both a metal and epoxy whereby a metal portion is laminated between a pair of epoxy portions.

The first pair of seal elements are fabricated from a selected first material and disposed within a respective one of the inner grooves. The second pair of seal elements are fabricated from a selected second material which is different from the selected first material and are disposed within a respective one of the outer grooves. The first pair of seal elements and the second pair of seal elements are operative to be compressed from a relaxed state to a compressed state when interposed and compressed between joined pieces of pipe thereby sealing between the joined pieces. The first and second pairs of seal elements are fabricated from corrosion-resistant material, elastomeric material, heat-resistant material, and fire-resistant material. Corrosion resistant material may be polymers, polyetheretherketone, perfluoroelastomers, polytetrafluorethylene, stainless steel alloys and titanium alloys. One embodiment of the present invention includes a polymeric structure as one of either first or second pairs of seal elements. The polymeric structure has a spring member disposed within it and is fabricated from a corrosion-resistant material. The polymeric structure has a pair of spaced-apart lips defining a structural opening into a cavity formed into the polymeric structure which opens towards the central opening of the retainer body.

One of the first and second pair of seal elements is fabricated from an elastomeric material such as plastics, perfluoroelastomers and rubber. One of the first and second pair of seal elements can also be fabricated from a combination of heat-resistant materials and fire-resistant materials. The heat-resistant material includes graphite or asbestos. The fire-resistant material includes metal and metal alloys.

When one of the first and second pair of seal elements is fabricated from a combination of heat-resistant materials and fire-resistant materials, the retainer body should be fabricated from a material such as stainless steel alloy, metal and metal alloys. When one of the first and second pair of seal elements is fabricated from a combination of heat-resistant materials and fire-resistant materials and the retainer body is fabricated from a material such as stainless steel alloys, metal and metal alloys, metal-to-metal contact should be made between the one of the first and second pairs of seal elements and the retainer body. A seal device having metal-to-metal contact between one of the first or second pairs of seal elements with the retainer body is considered fire-resistant under fire code.

Each of the inner pair of grooves is adapted to receive a respective one of the first pair of seal elements and each of the outer pair of grooves is adapted to receive a respective one of the second pair of seal elements. As an alternative embodiment, each of the inner pair of grooves is defined by a bottom wall, an outer wall and an inner wall. The outer wall is adapted to intersect the bottom wall at a substantially 90° angle and the inner wall is adapted to intersect the bottom wall at an acute angle. Generally, each groove of each of inner and outer pair of grooves is formed in cross-section in a shape of a polygon.

For certain applications, it is preferable that the tandem seal device comprises an annular retainer body, a first pair of annular seal elements and a second pair of annular seal elements. The annular retainer body would then have a central annular opening extending axially therethrough to allow the fluid to flow through the annular retainer body. Also, the annular retainer body would include an inner pair of circumferential grooves and an outer pair of circumferential grooves. Each of the inner grooves would be formed into a respective one of the first and second surfaces to concentrically surround the central annular opening in a spaced-apart relation and each of the outer grooves are formed into a respective one of the first and second surfaces to concentrically surround the respective ones of the inner pair of circumferential grooves in a spaced-apart relation.

These and other objects of the present invention will become more readily appreciated and understood from a consideration of the following detailed description of the exemplary embodiments when taken together with the accompanying drawings, in which:

DETAILED DESCRIPTION OF THE EXEMPLARY EMBODIMENTS

The present invention relates to a tandem seal device which may be interposed and compressed between joined pieces of pipe in a flow line and is particularly useful in highly corrosive, high pressure and/or high temperature fluid environments. It should be appreciated, however, that the tandem seal device described herein could be used for applications other than in flow lines. While the exemplary embodiments of the present invention are further described with respect to an annular tandem seal device to be interposed and compressed between flanged-end connections of adjacent pipe sections, it should be understood at the outset of this description that the features and benefits encompassed in the present invention may be applied to seal devices having other configurations, other flow line applications and other joint connections. For example, a tandem seal device may be interposed and compressed between adjacent sections of ventilating ducts operative to convey corrosive fumes from a laboratory furnace. One of ordinary skill in the art should readily be able to implement the features and benefits described with respect to the present invention in numerous applications requiring the use of tandem seal devices.

Figures 1, 2, 3:
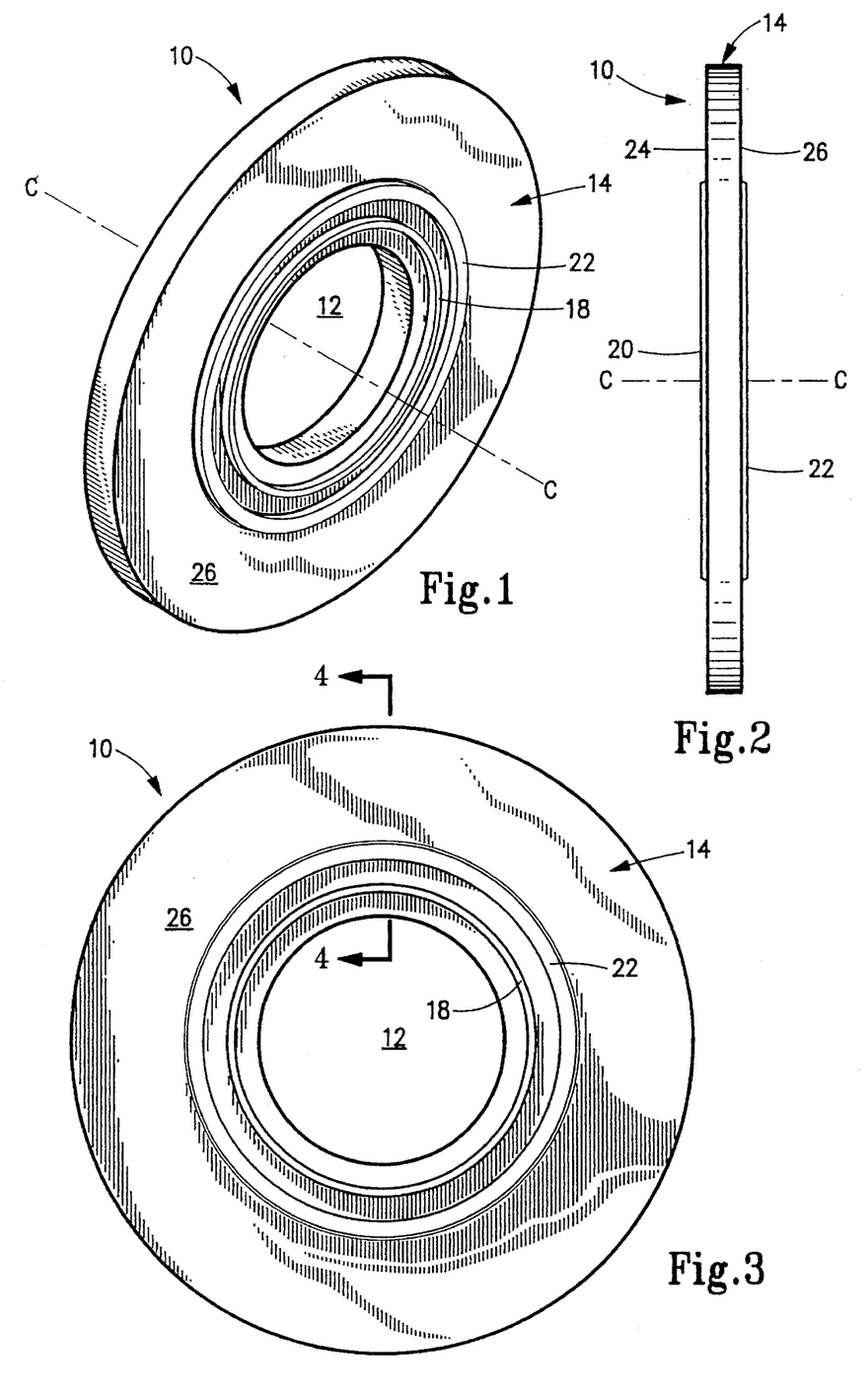
FIG. 1 is a perspective view of a tandem seal device according to a first exemplary embodiment of the present invention.
FIG. 2 is a side view in elevation of the tandem seal device shown in FIG. 1.
FIG. 3 is a front or rear view in elevation of the tandem seal device shown in FIGS. 1 and 2.
Figures 4, 6:
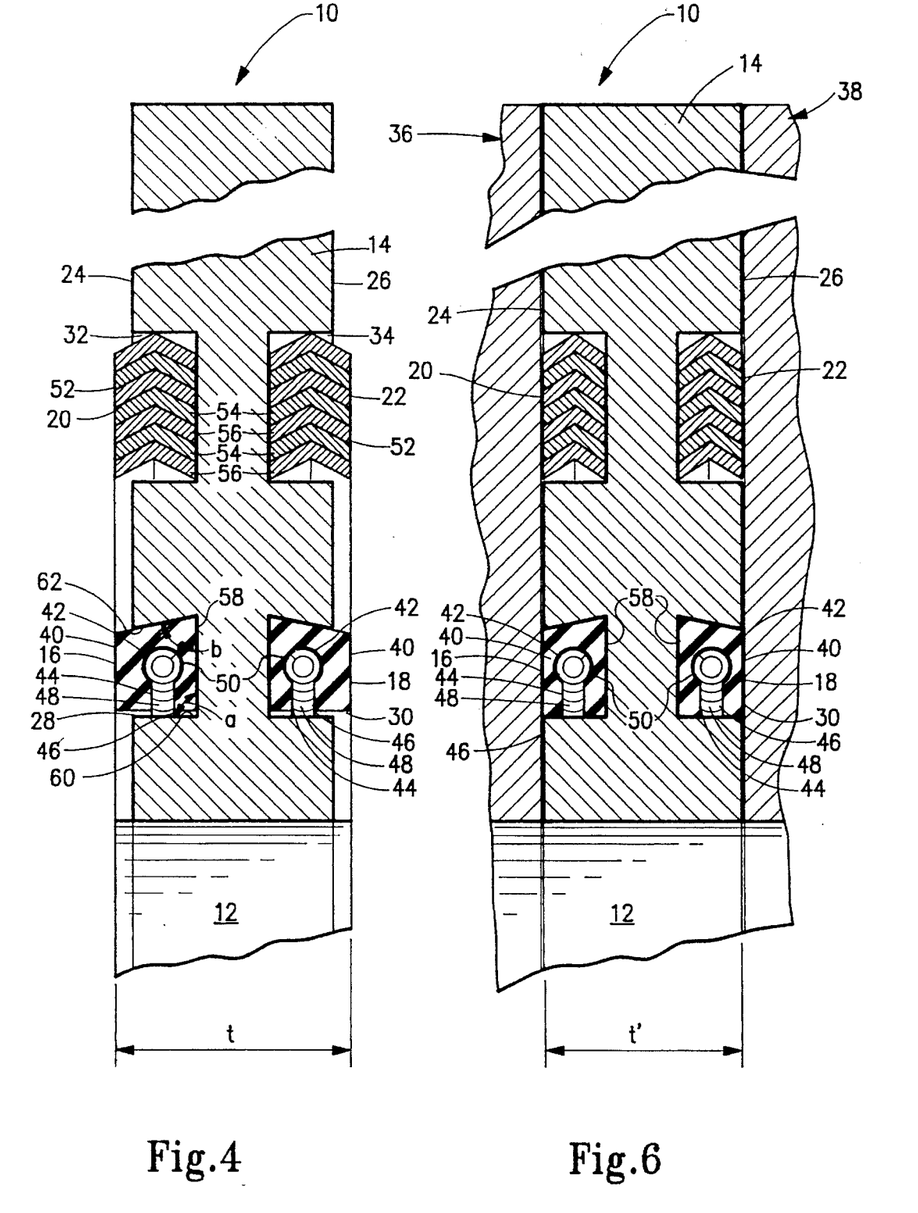
FIG. 4 is an enlarged view in cross-section taken along lines 4—4 of the tandem seal device shown in FIG. 3 in a relaxed state.
FIG. 6 is an enlarged partial view in cross-section of the tandem seal device of FIG. 5 interposed and compressed into a compressed state between the pair of flanged-end connections in the flow line.
Figure 5:
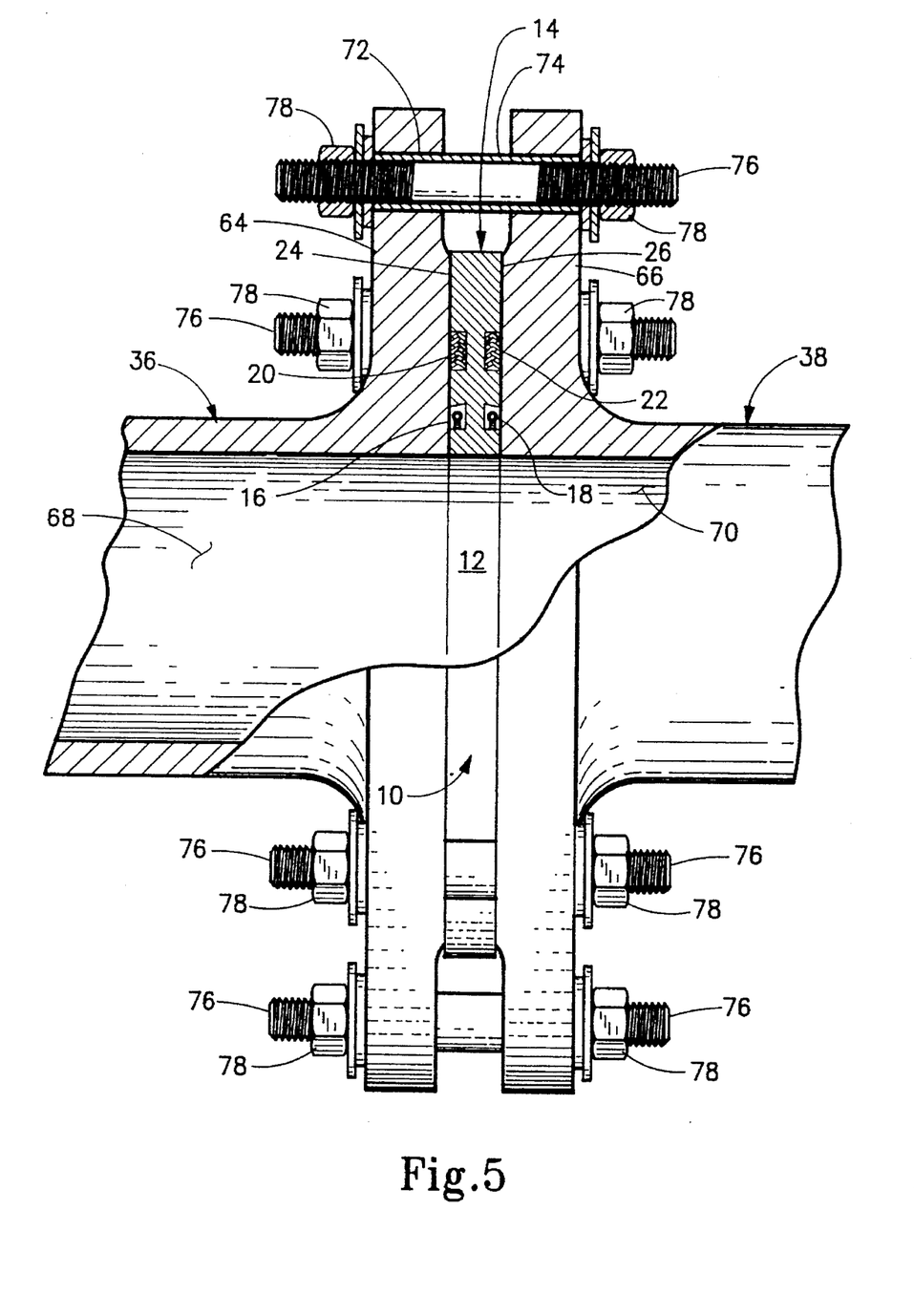
FIG. 5 is a side view in elevation, partially broken away, showing the tandem seal device of FIGS. 1–4 interposed and compressed between a pair of flanged-end connections in a flow line according to the first exemplary embodiment of the present invention.

A first exemplary embodiment of a tandem seal device 10 according to the present invention is generally shown in FIGS. 1–6. When not in use, that is, in a relaxed state, the tandem seal device is best shown in FIGS. 1–4. When in use, that is, in a compressed state, the tandem seal device is best shown in FIGS. 5 and 6. As shown in these figures, tandem seal device 10 has a shape of an annulus having a central annular opening 12 which extends axially therethrough about a central axis "C" which also represents the direction of fluid flow.

Tandem seal device 10 is adapted for interposing and compressing between joined pieces of pipe in a flow line and is operative for a fluid to flow therethrough without fluid leakage therebetween. In its broadest form, tandem seal device 10 comprises an annular retainer body 14, a first pair of annular seal elements 16 and 18 and a second pair of annular seal elements 20 and 22. Annular retainer body 14 has opposite flat first and second surfaces 24 and 26 respectively. As best shown in FIGS. 4 and 6, annular retainer body 14 includes an inner pair of circumferential grooves 28 and 30 and an outer pair of circumferential grooves 32 and 34. One of each inner grooves 28 and 30 are formed into a respective one of the first and second surfaces 24 and 26 respectively to concentrically surround central annular opening 12 in a spaced-apart relationship therefrom. Inner pair of circumferential grooves 28 and 30 are coaxially disposed from central annular opening 12 at a common dimension. Each one of outer grooves 32 and 34 are formed into a respective one of the first and second surfaces 24 and 26 to concentrically surround a respective one of inner grooves 28 and 30 in a spaced-apart relationship. Outer pair of circumferential grooves 32 and 34 are coaxially disposed from central annular opening 12 at a common dimension. Since annular retainer body 14 is fabricated from a rigid material, it is preferable that annular retainer body 14 be fabricated from stainless steel alloys, metal and metal alloys or epoxy.

Annular seal elements 16 and 18 are fabricated from a selected first material, and each is disposed within a respective one of inner grooves 28 and 30. Annular seal elements 20 and 22 are fabricated from a selected second material which is different from the first material of the first pair of annular seal elements 16 and 18. Each of annular seal elements 20 and 22 is disposed within a respective one of outer grooves 32 and 34. The first pair of annular seal elements 16 and 18 and the second pair of annular seal elements 20 and 22 are operative to be compressed from a relaxed state as shown in FIGS. 1–4 to a compressed state as shown in FIGS. 5 and 6 when interposed and compressed between joined first and second pieces of pipe 36 and 38 thereby sealing between the joined pieces (FIGS. 5 and 6).

The first pair of annular seal elements 16 and 18 and the second pair of annular seal elements 20 and 22 are fabricated from material that is corrosion-resistant, elastomeric, heat-resistant and/or fire-resistant. Corrosion-resistant material includes polymers, polyetheretherketone, perfluoroelastomers, polytetrafluorethylene, stainless steel alloys and titanium alloys. Polymers exhibit excellent characteristics for corrosion resistance. When corrosion resistance is a factor in designing a seal device, it is preferable that, one of either the first pair of annular seal elements 16 and 18 the second pair of annular seal elements 20 and 22 is fabricated from a polymeric material For the first exemplary embodiment of the present invention, each of the first pair of annular seal elements 16 and 18 includes a polymeric structure 40 which has a spring member 42 disposed circumferentially therewithin. If corrosion is a consideration, it is preferable that spring members 42 be fabricated from a corrosion resistant material such as a stainless steel alloy. Polymeric structures 40 have a pair of spaced-apart lips 44 and 46 which define a structural opening 48 into a cavity 50 formed circumferentially into polymeric structure 40. Structural opening 48 opens towards central annular opening 12 of annular retainer body 14. Cavity 50 is operative to receive spring member 42 which provides a resilient force to polymeric structure 40 when compressed to the compressed state.

When fire resistance is a factor in designing a seal device, one of either the first pair of annular seal elements 16 and 18 of the second pair of annular seal elements 20 and 22 is fabricated from a combination of heat-resistant material and fire-resistant material. Heat-resistant material includes graphite, asbestos, ceramic compounds or other similar material. Fire-resistant materials includes metal and metal alloys. For purposes of the first exemplary embodiment of the present invention, the second pair of annular seal elements 20 and 22 are conventional graphite-filled, spiral-wound seals 52. The combination of heat-resistant material and fire-resistant material is graphite 54 and stainless steel 56.

Each of inner grooves 28 and 30 is adapted to receive a respective one of first pair of annular seal elements 16 and 18, and each of the outer pair of grooves 32 and 34 is adapted to receive a respective one of the second pair of annular seal elements 20 and 22. For the first exemplary embodiment of the present invention, as shown in FIG. 4, each of the inner pair of circumferential grooves 28 and 30 is defined by a bottom wall 58, an inner wall 60 and an outer wall 62. Inner wall 60 is adapted to intersect bottom wall 58 at an angle "a" of substantially 90° and outer wall 62 is adapted to intersect bottom wall 58 at an acute angle "b" therebetween. Thus, the shape of polymeric structure 40 comports with the cross-sectional configuration of inner grooves 28 and 30. Outer grooves 32 and 34 are rectangular in cross-section and are adapted to receive conventional graphite-filled, spiral-wound seal 52.

When one of the first pair of annular seal elements 16 and 18 or the second pair of annular seal elements 20 and 22 is fabricated from a combination of heat-resistant material and fire-resistant material, it is preferable that annular retainer body 14 be fabricated from stainless alloys, metal or metal alloys. When one of the first pair of annular seal elements 16 and 18 or the second pair of annular seal elements 20 and 22 is fabricated from a combination of heat-resistant material and fire-resistant material and annular retainer body 14 is fabricated from stainless steel alloys, metal or metal alloys, metal-to-metal contact is therefore made between one of the first and second pairs of annular seal elements and second pairs of annular seal elements and the annular retainer body. This metal-to-metal contact is required to comply with local fire codes.

As best shown in FIG. 4, tandem seal device 10 has a thickness "t" when in the relaxed state and a thickness "t'" when in the compressed state. One of ordinary skill in the art would appreciate that thickness "t" is greater than thickness "t'" and that annular retainer body 14 acts as a compression limiter when tandem seal device 10 is interposed and compressed between joined pieces of pipe as shown in FIG. 5. With reference to FIG. 5 and by way of example only, first piece of pipe 36 has a first annular flange 64 which is adapted to be placed in opposed, facing relation with a second annular flange 66 of second piece of pipe 38. First piece of pipe 36 has an interior passageway 68 which is axially aligned with a second interior passageway 70 of second piece of pipe 38. First annular flange 64 is provided with a plurality of bolt openings 72 which axially align with bolt openings 74 of second annular flange 66 in order to receive bolts 76 which, in turn, receive nuts 78 to compressively join first and second pieces of pipe 36 and 38 together. Thus, with tandem seal device 10 interposed between joined first and second pieces of pipe 36 and 38, tandem seal device 10 is compressed therebetween so as to seal the joined pieces of pipe thereby preventing leakage of the fluid contained in the flow line.

The first embodiment of the present invention was fire tested by an independent party under American Petroleum Institute (API) specifications for fire testing end-connections. The fire test was carried out over an eighty-four minute period which included time for burn and cool down. The total leakage recorded was 0.25 liters yielding an actual leakage rate of 3 ML/minute. The maximum allowable leakage rate under the API fire test is 8.64 ML/minute.

An independent party also conducted a nitrogen leak test comparing the conventional graphite-filled, spiral-wound seal device described above and the first exemplary embodiment of the present invention. The conventional seal device was subjected to the nitrogen leak test between flanged end-connections of a pipeline test fixture at various bolt torques with a constant pressure of 4000 lbs. per square inch of nitrogen applied to the test fixture and seal device. The test results of the leakage rates and torque values for the conventional graphite-filled, spiral-wound seal device is shown in Table I.

TABLE I

| Conventional Spiral-Wound Seal | | |
| --- | --- | --- |
| Torque* | PSI Nitrogen | Leakage Rate |
| 26 | 4000 | 32 cc/10 seconds |
|  |  | 192 cc/minute |
| 34 | 4000 | 102 cc/6 minutes |
|  |  | 17 cc/minute |
| 43 | 4000 | 28 cc/15 minutes |
|  |  | 1.86 cc/minute |
| 50 | 4000 | 0 cc/15 minutes |
|  |  | 0 cc/minute |

*(ft.-lbs.)

The first exemplary embodiment of the present invention was then tested. The test results of the leakage rates and torque values for the first exemplary embodiment of the present invention is shown in Table II.

TABLE II

| First Exemplary Embodiment of the Present Invention | | |
| --- | --- | --- |
| Torque* | PSI Nitrogen | Leakage Rate |
| 90 | 4000 | 0 cc/15 minutes |
|  |  | 0 cc/minute |
| 120 | 4000 | 0 cc/15 minutes |
|  |  | 0 cc/minute |
| 150 | 4000 | 0 cc/15 minutes |
|  |  | 0 cc/minute |

*(ft.-lbs.)

Note that the torque values for the conventional spiral-wound seal in Table I and the first exemplary embodiment of the present invention in Table II are not the same. Since the sealing contact areas of the seal devices are not the same, the torque values were adjusted so that the pressure applied to the sealing contact areas were substantially the same for comparison purposes of the conventional spiral-wound seal and the first exemplary embodiment of the present invention.

Figures 7, 8, 9, 10:
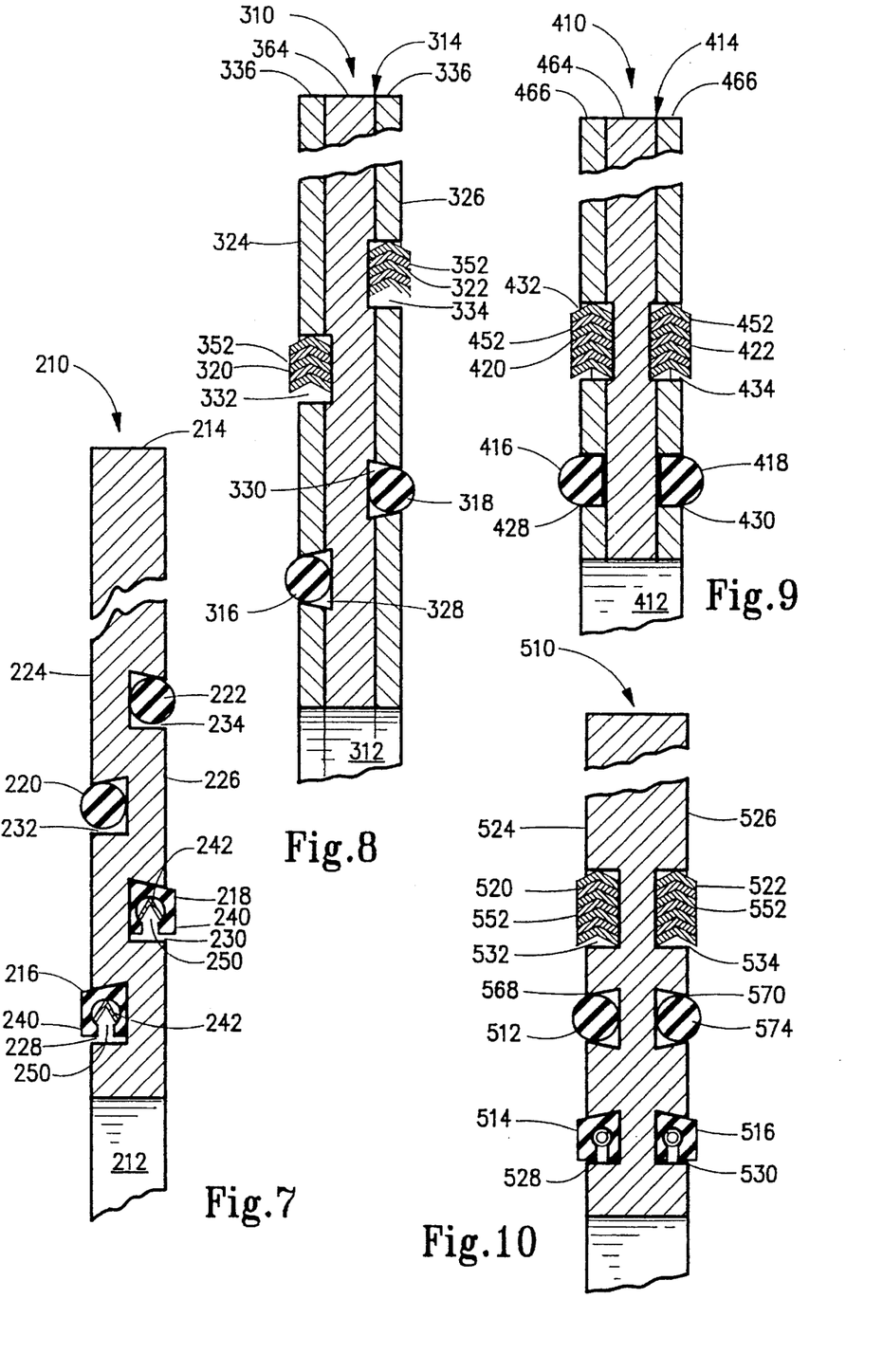
FIG. 7 is a partial view in cross-section showing a second exemplary embodiment of the present invention in a relaxed state having a first pair of radially-offset grooves and a second pair of radially-offset grooves.
FIG. 8 is a partial view in cross-section showing a third exemplary embodiment of the present invention having a laminated retainer body having O-ring seal elements disposed in the inner pair of grooves and graphite-filled, spiral-wound seal elements disposed in the outer pair of grooves.
FIG. 9 is a partial view in cross-section showing a fourth exemplary embodiment of the present invention having a laminated retainer body with corrosion-resistant, high-pressure seal elements disposed in the inner pair of grooves and a pair of graphite-filled, spiral-wound seal elements disposed in the outer pair of grooves.
FIG. 10 is a partial view in cross-section showing a fifth exemplary embodiment of the present invention having a pair of corrosion-resistant seal elements disposed in the inner pair of grooves, a pair of high-pressure resistant seal elements disposed in an intermediate pair of grooves and a pair of fire-resistant seal elements disposed in the outer pair of grooves.

A second exemplary embodiment of a tandem seal device 210 is shown in FIG. 7. Each of a first pair of seal elements 216 and 218 is disposed in a respective one of an inner pair of circumferential grooves 228 and 230. Each of a second pair of seal elements 220 and 222 is disposed in a respective one of an outer pair of circumferential grooves 232 and 234. Inner circumferential groove 228 into a flat first surface 224 of an annular retainer body 214 is radially offset from inner circumferential groove 230 formed into a flat second surface 226 of annular retainer body 214. Outer circumferential groove 232 formed into flat first surface 224 of annular retainer body 214 is radially offset from outer circumferential groove 234 formed into flat second surface 226 of annular retainer body 214. Offsetting respective inner and outer pairs of circumferential grooves is particularly useful when a relatively thin annular retainer body 214 is required.

Each of the first pair of seal elements 216 and 218 is a polymeric structure 240 fabricated from a corrosion-resistant material such as a polymer. A V-shaped or U-shaped spring member 242 such as finger spring which is disposed in a cavity 250 formed into polymeric structure 240 is also fabricated from a corrosion-resistant material such as stainless steel. The second pair of seal elements 220 and 222 are fabricated from an elastomeric material such as rubber, perfluorelastomers and plastic. The second exemplary embodiment of the present invention, the second pair of seal elements 220 and 222 are O-rings fabricated from rubber. This second exemplary embodiment of tandem seal device 210 of the present invention is particularly suitable for an application where corrosion-resistance is a primary consideration and high-pressure resistance is a secondary consideration.

A third exemplary embodiment of a tandem seal device 310 of the present invention is shown in FIG. 8. Annular retainer body 314 includes a metal portion 364 which is laminated between a pair of epoxy portions 366. Each of a first pair of seal elements 316 and 318 is disposed respectively in a pair of inner circumferential grooves 328 and 330. Again, the first pair of seal elements are O-rings fabricated from an elastomeric material such as rubber. Each of a second pair of seal elements 320 and 322 is disposed respectively in an outer pair of circumferential grooves 332 and 334. The second pair of seal elements 320 and 322 are conventional graphite-filled, spiral-wound seals. Inner circumferential groove 328 and outer circumferential groove 332 formed into a flat first surface 324 are radially offset from inner circumferential groove 330 and outer circumferential groove 334 formed into a flat second surface 326. This third exemplary embodiment of the tandem seal device 310 of the present invention is particularly useful with applications where high-pressure resistance is a primary consideration and where fire code requires the use of a fire-resistant seal device. Note that outer circumferential grooves 332 and 334 are formed through epoxy portions 366 and into metal portion 364 so that metal-to-metal contact can be made between metal portion 364 of annular retainer body 314 and the conventional graphite-filled, spiral-wound seal 352.

A fourth exemplary embodiment of a tandem seal device 410 is shown in FIG. 9. In annular retainer body 414 includes a metal portion 464 laminated between a pair of epoxy portions 466. A first pair of seal elements 416 and 418 respectively disposed within inner circumferential groove 428 and 430 are fabricated from a perfluorelastomer material which possesses elastomeric as well as anti-corrosive qualities. A second pair of seal elements 420 and 422 respectively disposed in an outer pair of circumferential grooves 432 and 434 are conventional graphite-filled, spiral-wound seals 452. This fourth exemplary embodiment of the present invention is particularly useful for high-pressure applications in highly-corrosive environments and where local fire code requires the seal device to be fire-resistant.

A fifth exemplary embodiment of a tandem seal device 510 of the present invention is shown in FIG. 10. Each of an inner pair of circumferential grooves 528 and 530 and an intermediate pair of circumferential grooves 568 and 570 and an outer pair of circumferential grooves 532 and 534 are formed respectively in a flat first surface 524 and a flat second surface 526 of annular retainer body 514. A first pair of seal elements 516 disposed in inner circumferential grooves 528 and 530 are polymeric structures 540. A second pair of seal elements 520 and 522 respectively disposed in each outer circumferential groove 532 and 534 are conventional graphite-filled, spiral-wound seals 552. A third pair of seal elements 572 and 574, each being disposed in a respective intermediate circumferential groove 568 and 570 are O-rings fabricated from an elastomeric material. This fifth exemplary embodiment of the present invention is particularly useful in a highly-corrosive, high-pressure environment and it also meets local fire code as a fire-resistant seal device.

As stated above, the tandem seal device may be fabricated in variety of configurations other than an annular one. It follows then that the tandem seal device comprises a retainer body, a first pair of seal elements and a second pair of seal elements. The retainer body has opposite first and second surfaces and a central opening extending axially therethrough to allow the flow of fluid through the retainer body. The retainer body includes a inner pair of continuous grooves and an outer pair of continuous grooves. Each one of the continuous grooves are formed into a respective one of the first and second surfaces in a spaced-apart surrounding relation to the opening. Each one of the other grooves is formed into a respective one of the first and second surfaces in a spaced-apart surrounding relation to the respective one of the inner pair of continuous grooves. The grooves can have a variety of cross-sectional configurations, such as the rectangular and trapezoidal configurations illustrated. It should be understood that the other cross-sectional configurations are within the scope of this invention, although it is preferred that the cross-section be polygonal in shape.

The first pair of seal elements are fabricated from a selected first material and disposed within a respective one of the inner grooves. The second pair of seal elements are fabricated from a selected second material different from the selected first material and disposed within a respective one of the outer grooves. The first pair of seal elements and the second pair of seal elements are operative to be compressed from a relaxed state to a compressed state when interposed and compressed between joined pieces of pipe thereby sealing between the joined pieces.

One of ordinary skill in the art would appreciate that the tandem seal device of the present invention is particularly useful in highly-corrosive, high-temperature and/or high-pressure environments. Also, when employing a conventional spiral-wound seal, the present invention should meet local fire codes as a fire-resistant seal device. Furthermore, having a pair of spiral-wound seals embedded in a respective groove formed on both sides of the seal device prevents it from bursting apart in fire conditions. Lastly, depending upon design criteria, the inner seal element can perform a primary function of resisting corrosion, high-temperature or high-pressure and the outer seal can provide a secondary function of resisting a remaining function of corrosion, high-temperature or high-pressure.

Accordingly, the present invention has been described with some degree of particularity directed to the exemplary embodiments of the present invention. It should be appreciated, though, that the present invention is defined by the following claims construed in light of the prior art so that modifications or changes may be made to the preferred embodiment of the present invention without departing from the inventive concepts contained herein.

I claim:

1. A tandem seal device for interposing and compressing between joined pieces of pipe in a flow line that is operative for a fluid to flow therethrough without fluid leakage therebetween, comprising:

(a) a retainer body having opposite first and second surfaces and a central opening extending axially therethrough to allow the flow of fluid through said retainer body, said retainer body including an inner pair of continuous grooves and an outer pair of continuous grooves with said inner pair of continuous grooves being radially spaced closer to the central opening than said outer pair of continuous grooves, each one of said grooves being formed into a respective one of the first and second surfaces in spaced-apart surrounding relation to the opening, each one of said outer grooves being formed into a respective one of the first and second surfaces in spaced-apart surrounding relation to the respective one of said inner pair of continuous grooves;

(b) a first pair of seal elements fabricated from a selected first material, there being one of said first pair of seal elements disposed within each of said inner grooves; and (c) a second pair of seal elements fabricated from a selected second material different from said selected first material, there being one of said second pair of seal elements disposed within each of said outer grooves, said first pair of seal elements and said second pair of seal elements operative to be compressed from a relaxed state to a compressed state when interposed and compressed between joined pieces of pipe thereby sealing between the joined pieces.

2. A tandem seal device according to claim 1 wherein said retainer body is fabricated from a rigid material.

3. A tandem seal device according to claim 1 wherein said retainer body is fabricated from a material selected from a group consisting of stainless steel alloys, metal alloys and epoxy.

4. A tandem seal device according to claim 3 wherein said retainer body includes a metal portion laminated between a pair of epoxy portions.

5. A tandem seal device according to claim 2 wherein said first and second pairs of seal elements are fabricated from materials selected from a group consisting of: corrosion-resistant material, plastic material, elastomeric material, heat-resistant material and fire-resistant material.

6. A tandem seal device according to claim 5 wherein said corrosion-resistant material is selected from a group consisting of: polymers, polyetheretherketone, perfluorelastomers, polytetrafluorethylene, stainless steel alloys and titanium alloys.

7. A tandem seal device according to claim 5 wherein said elastomeric material is selected from a group consisting of: perfluorelastomers and rubber.

8. A tandem seal device according to claim 5 wherein one of said first and second pairs of seal elements is fabricated from a combination of heat-resistant materials and fire-resistant materials.

9. A tandem seal device according to claim 8 wherein said heat-resistant material is selected from a group consisting of: graphite and asbestos.

10. A tandem seal device according to claim 8 wherein said fire-resistant material is selected from a group consisting of: metal and metal alloys.

11. A tandem seal device according to claim 8 wherein when one of said first and second pairs of seal elements is fabricated from a combination of heat-resistant materials and fire-resistant materials, said retainer body is fabricated from a material selected from a group consisting of stainless steel alloys, metal and metal alloys.

12. A tandem seal device according to claim 11 wherein one of said first and second pairs of seal elements is fabricated from a combination of heat-resistant materials and fire-resistant materials and said retainer body is fabricated from a material selected from a group consisting of stainless steel alloys, metal and metal alloys, said one of said first and second pairs of seal elements and said retainer body being in metal-to-metal contact.

13. A tandem seal device according to claim 1 wherein each of said inner pair of grooves is adapted to receive a respective one of said first pair of seal elements and wherein each of said outer pair of grooves is adapted to receive a respective one of said second pair of seal elements.

14. A tandem seal device according to claim 13 wherein each of said inner pair of grooves is defined by a bottom wall, an outer wall and an inner wall, said inner wall adapted to intersect said bottom wall at a substantially 90-degree angle, said outer wall adapted to intersect said bottom wall at an acute angle.

15. A tandem seal device according to claim 13 wherein each groove of each of said inner and outer pairs of grooves is formed in cross-section in a shape of a polygon.

16. A tandem seal device for interposing and compressing between joined pieces of pipe in a flow line that is operative for a fluid to flow therethrough without fluid leakage therebetween, comprising:

(a) an annular retainer body having opposite flat first and second surfaces and a central annular opening extending axially therethrough to allow the fluid to flow through said annular retainer body, said annular retainer including an inner pair of circumferential grooves and an outer pair of circumferential grooves spaced radially from said inner pair of circumferential grooves, each one of said inner grooves being formed into a respective one of the first and second surfaces to concentrically surround in a spaced-apart relation to the annular opening, each one of said outer grooves being formed into a respective one of the first and second surfaces to concentrically surround in a spaced-apart relation to the respective one of said inner pair of circumferential grooves;

(b) a first pair of annular seal elements fabricated from a selected first material, there being one of said first pair of annular seal elements disposed within each of said inner grooves; and (c) a second pair of annular seal elements fabricated from a selected second material different from said first materisl, there being one of said second pair of annular seal elements disposed within each of said outer grooves, said first pair of annular seal elements and said second pair of annular seal elements operative to be conpressed from a relaxed state to a compressed state when interposed and compressed between joined pieces of pipe thereby sealing between the joined pieces.

17. A tandem seal device according to claim 16 wherein said annular retainer body is fabricated from a rigid material.

18. A tandem seal device according to claim 16 wherein said retainer body is fabricated from a material selected from a group consisting of stainless steel alloys, metal alloys and epoxy.

19. A tandem seal device according to claim 18 wherein said annular retainer body includes a metal portion laminated between a pair of epoxy portions.

20. A tandem seal device according to claim 17 wherein said first and second pairs of annular seal elements are fabricated from materials selected from a group consisting of: corrosion-resistant material, plastic material, elastomeric material, heat-resistant material and fire-resistant material.

21. A tandem seal device according to claim 20 wherein said corrosion-resistant material is selected from a group consisting of: polymers, polyetheretherketone, perfluorelastomers, polytetrafluoroethylene, stainless steel alloys and titanium alloys.

22. A tandem seal device according to claim 21 wherein one of said first and second pairs of annular seal elements includes a polymeric structure having a spring member disposed circumferentially within said polymeric structure, said spring member fabricated from a corrosion-resistant material.

23. A tandem seal device according to claim 22 wherein said polymeric structure has a pair of spaced apart lips defining a structural opening into a cavity formed circumferentially into said polymeric structure and opening towards the central opening of said retainer body, said cavity operative to receive said spring member.

24. A tandem seal device according to claim 20 wherein said elastomeric material is selected from a group consisting of: perfluorelastomers and rubber.

25. A tandem seal device according to claim 20 wherein one of said first and second pairs of annular seal elements is fabricated from a combination of heat-resistant materials and fire-resistant materials.

26. A tandem seal device according to claim 25 wherein said heat-resistant material is selected from a group consisting of: graphite and asbestos.

27. A tandem seal device according to claim 25 wherein said fire-resistant material is selected from a group consisting of: metal and metal alloys.

28. A tandem seal device according to claim 25 wherein when one of said first and second pairs of annular seal elements is fabricated from a combination of heat-resistant materials and fire-resistant materials, said annular retainer body is fabricated from a material selected from a group consisting of stainless steel alloys, metal and metal alloys.

29. A tandem seal device according to claim 28 wherein one of said first and second pairs of annular seal elements is fabricated from a combination of heat-resistant materials and first-resistant materials and said annular retainer body is fabricated from a material selected from a group consisting of stainless steel alloys, said one of said first and second pairs of annular seal elements and said annular retainer body being in metal-to-metal contact.

30. A tandem seal device according to claim 16 wherein each of said inner grooves is adapted to receive a respective one of said first pair of annular seal elements and wherein each of said outer pair of circumferential grooves is adapted to receive a respective one of said second pair of annular seal elements.

31. A tandem seal device according to claim 30 wherein each of said inner pair of circumferential grooves is defined by a bottom wall, an outer wall and an inner wall, said inner wall adapted to intersect said bottom wall at a substantially 90-degree angle, said outer wall adapted to intersect said bottom wall at an acute angle therebetween.

32. A tandem seal device according to claim 30 wherein each circumferential groove of each inner and outer pair of circumferential grooves is formed in cross-section in a shape of a polygon.

33. A tandem seal device for interposing and compressing between joined pieces of pipe in a flow line that is operative for fluid to flow therethrough without fluid leakage therebetween, comprising:

(a) a retainer body having opposite first and second surfaces and a central opening extending axially therethrough to allow the flow of fluid through said retainer body, said retainer body including an inner pair of continuous grooves and an outer pair of continuous grooves with said inner pair of continuous grooves being radially spaced closer to the central opening than said outer pair of continuous grooves, each one of said inner grooves being formed into a respective one of the first and second surfaces in spaced-apart surrounding relation to the opening, each one of said outer grooves being formed into a respective one of the first and second surfaces in spaced-apart surrounding relation to the respective one of said inner pair of continuous grooves;

(b) a first pair of seal elements fabricated from a selected first material, there being one of said first pair of seal elements disposed within each of said inner grooves; and (c) a second pair of seal elements fabricated from a selected second material different from said selected first material, there being one of said second pair of seal elements disposed within each of said outer grooves, wherein one of said first and second pairs of seal elements includes a polymeric structure having a spring member disposed within said polymeric structure, said spring member fabricated from a corrosion-resistant material, said first pair of seal elements and said second pair of seal elements operative to be compressed from a relaxed state to a compressed state when interposed and compressed between the joined pieces of pipe thereby sealing between the joined pieces.

34. A tandem seal device according to claim 33 wherein said polymeric structure has a pair of spaced apart lips defining structural opening into a cavity formed into said polymeric structure and opening towards the central opening of said retainer body, said cavity operative to receive said spring.

* * * * *